(12) United States Patent
Chabanne et al.

(10) Patent No.: US 10,375,066 B2
(45) Date of Patent: Aug. 6, 2019

(54) AUTHENTICATION METHOD AND SYSTEM BY GARBLED CIRCUIT

(71) Applicant: Safran Identity & Security, Issy-les-Moulineaux (FR)

(72) Inventors: Herve Chabanne, Issy les Moulineaux (FR); Constance Morel, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 204 days.

(21) Appl. No.: 15/648,300

(22) Filed: Jul. 12, 2017

(65) Prior Publication Data

US 2018/0019997 A1    Jan. 18, 2018

(30) Foreign Application Priority Data

Jul. 13, 2016   (FR) .................................... 16 56776

(51) Int. Cl.
*H04L 29/06*    (2006.01)
*H04L 9/32*     (2006.01)

(52) U.S. Cl.
CPC ........ *H04L 63/0861* (2013.01); *H04L 9/3231* (2013.01); *H04L 63/061* (2013.01); *H04L 2209/16* (2013.01); *H04L 2209/50* (2013.01)

(58) Field of Classification Search
CPC . H04L 63/0861; H04L 9/3231; H04L 63/061; H04L 2209/16; H04L 2209/50
USPC ......................................................... 713/171
See application file for complete search history.

(56) References Cited

U.S. PATENT DOCUMENTS

| | | | | |
|---|---|---|---|---|
| 8,488,791 | B2 * | 7/2013 | Baechler | H04L 9/3218 380/255 |
| 8,515,058 | B1 * | 8/2013 | Gentry | H04L 9/008 380/28 |
| 8,958,552 | B2 * | 2/2015 | Hattori | H04L 9/008 380/30 |
| 9,055,038 | B1 * | 6/2015 | Lu | H04L 63/0428 |
| 9,350,731 | B2 * | 5/2016 | Patey | H04L 9/3231 |
| 9,906,511 | B1 * | 2/2018 | Kolman | H04L 63/08 |
| 9,960,919 | B2 * | 5/2018 | Lindell | H04L 9/085 |
| 2010/0100724 | A1 * | 4/2010 | Kaliski, Jr. | H04L 9/3013 713/155 |

(Continued)

FOREIGN PATENT DOCUMENTS

WO     WO-2016135738 A1 *   9/2016   ............ G06F 21/00

OTHER PUBLICATIONS

Yao, "Protocols for Secure Computations", in IEEE Symposium on Foundations of Computer Science, 1982, pp. 160-164 (Year: 1982).*

(Continued)

*Primary Examiner* — Shahriar Zarrineh
(74) *Attorney, Agent, or Firm* — Womble Bond Dickinson (US) LLP

(57) ABSTRACT the invention proposes a method and an associated system for authenticating a user, by means of the redundancy present between several images of a video, the method using garbled circuits, named variant garbled circuits, associated with the alternative bits between the images of the video and a garbled circuit named invariant garbled circuit, associated with the invariant bits between the images of the video, so that the invariant garbled circuit only needs to be evaluated a single time.

13 Claims, 6 Drawing Sheets

(56) References Cited

U.S. PATENT DOCUMENTS

| | | | |
|---|---|---|---|
| 2011/0211692 A1* | 9/2011 | Raykova | H04L 9/008 380/46 |
| 2012/0079602 A1* | 3/2012 | Kolesnikov | H04L 9/0662 726/26 |
| 2012/0233460 A1* | 9/2012 | Kamara | H04L 9/3218 713/168 |
| 2013/0148868 A1* | 6/2013 | Troncoso Pastoriza | G06K 9/00288 382/118 |
| 2014/0108435 A1* | 4/2014 | Kolesnikov | G06F 7/24 707/754 |
| 2015/0007258 A1* | 1/2015 | Patey | H04L 9/00 726/1 |
| 2015/0213079 A1* | 7/2015 | Shukla | G06F 16/2365 707/687 |
| 2015/0295925 A1* | 10/2015 | Patey | H04L 9/3231 713/186 |
| 2015/0349958 A1* | 12/2015 | Lindell | H04L 9/085 713/168 |
| 2016/0044031 A1* | 2/2016 | Kolesnikov | H04L 63/0428 713/170 |
| 2016/0205095 A1* | 7/2016 | Morel | H04L 9/3231 726/6 |
| 2017/0163421 A1* | 6/2017 | Chase | H04L 9/3066 |
| 2017/0242961 A1* | 8/2017 | Shukla | G06F 21/32 |
| 2018/0019868 A1* | 1/2018 | Pe'Er | G06F 21/00 |
| 2018/0019997 A1* | 1/2018 | Chabanne | H04L 63/061 |

OTHER PUBLICATIONS

Ying Luo;Sen-Ching Samson Cheung; Tommaso Pignata;Riccardo Lazzeretti; Mauro Barni, "An efficient protocol for private iris-code matching by means of garbled circuit", 2012, 19th IEEE International Conference on image processing, pp. 2653-2656 (Year: 2012).*

* cited by examiner

AUTHENTICATION METHOD AND SYSTEM BY GARBLED CIRCUIT

The present invention generally relates to the secured authentication of individuals, the authentication being carried out by comparing a datum of an individual for which identification is desired, with a datum of the same nature of listed individuals, this datum being stored in a base.

The invention notably applies to biometric authentication of an individual, wherein the compared data of the individual and of the database are biometric information relative for example to the iris, or to the shape of the face of the bearer.

STATE OF THE ART

In the field of authentication and of biometry for example, it is common to compare two data: a recruitment datum, enlisted beforehand, and a test datum, which is an image obtained from the person which authentication is desired. The individual is authenticated when the recruitment datum corresponds to the test datum with a sufficiently significant level of similarity. This will be referred to in the following by matching between these data.

As biometrical data are sensitive data, they should not be revealed during the authentication. For this, it is possible to carry out authentication by means of a secure multiparty computation, (known as SMC, see reference [SMC] at the end of the description), which consists of carrying out a calculation between several participants each having one or several inputs of a function to be calculated, so that the participants only learn the result of the computation at the end of the computation, and do not obtain any information on the inputs held by the other participants.

From among the SMC protocols, the Yao protocol (see reference [YAO] and reference [SAD] which apply such a protocol and reference [SNY] which presents it), which applies garbled circuits, proposes an efficient method. This method will be explained in the description.

Unfortunately, the application of a single comparison between the recruitment datum and a single test datum is not always sufficient for allowing authentication, since the test datum may be acquired under poor conditions and the comparison may fail even if the user who seeks to be authenticated actually corresponds to the recruited user. It is then often necessary to again give a chance or several chances to the user during a rejection. Video is increasingly used for solving this problem.

The method consists of taking a short video instead of taking a single photograph, of selecting the best images of the video and then comparing them one by one with the selected images of the video with the recruitment datum until a match is obtained.

Unfortunately, garbled circuits cannot be reused in order to successively compare several data. Indeed, as soon as a same circuit is used twice in succession, the entity executing it may then infer certain input bits of the other party. Confidentiality of the data is no longer observed.

Therefore, the implementation of the Yao protocol from a test video instead of a single test image involves the use of a garbled circuit for each image of the video, which is too costly in terms of computing time, including for a delocalized server.

A few scientific articles (see reference [GE] and [GO]) have garbled circuits which may be reused but the proposed methods are still not sufficiently efficient for practical cases. Indeed, these reusable circuits are based on asymmetrical cryptography whereas the conventional garbled circuits are based on symmetrical cryptography.

Therefore there exists a need for authenticating an individual from a biometric datum in a secured way, and more rapidly and less costly in terms of computing capacity than in the already proposed solutions.

PRESENTATION OF THE INVENTION

For this, the invention proposes a method for authenticating a user applied by means of a system comprising:
- a first client unit comprising a memory in which is stored a reference biometric datum,
- a second client unit comprising means for acquiring at least one test biometric datum, and
- a server, configured for generating garbled circuits for evaluating functions, each garbled circuit having as inputs a set of encryption keys of input data bits of the function to be evaluated and as an output the encryption keys corresponding to the bits of the result of the evaluated function, and wherein the steps for calculating the function are broken down into the form of elementary logic operations, each garbled circuit further comprising a set of coding keys of each of the possible inputs and outputs of each elementary logic operation, the method comprising the comparison of a number C of test data acquired on the user by the second client unit with the reference datum, said comparison comprising the calculation, by means of garbled circuits, of a distance between the reference datum and each test datum, characterized in that the comparison comprises the application of the following steps:
- from a set S comprising indices of the test data, such that the value of the bit of each test datum associated with an index of the set S is invariant on the whole of the C test data, the server breaks down the function to be evaluated into:
- a sub-function $f_S$ which comprises all the logical operations for which the output exclusively depends on input bits for which the index belongs to said set S and generates for the evaluation of this sub-function $f_S$ a single garbled circuit, named invariant garbled circuit,
- a sub-function $f_{\overline{S}}$ which comprises all the logical operations of the function f non-evaluated by the sub-function $f_S$ and generates, for each of the C test data, a garbled circuit, named variant garbled circuit, for evaluation of the sub-function $f_{\overline{S}}$,
- the server randomly generates the encoding keys for the single invariant garbled circuit and for the C variant garbled circuits,
- the server sends the garbled circuits to one of the client units,
- both client units recover from the server by oblivious transfer:
- encoding keys corresponding to the values of the input bits of the function to be evaluated depending on reference data and on the C test data respectively at their disposal, the first client unit recovering a set of keys relative to the reference biometric datum and the second client unit recovering a set of keys comprising a key for each bit associated with an index belonging to the set S and C keys for each bit associated with an index not belonging to S, and
- the client unit having received the garbled circuits recovers the encoding keys from the other client unit, and evaluates the function for each of the C test data, with as inputs the recovered keys, by executing the garbled circuits, depending on said evaluations of f, either authentication or not of the user or of the object.

Benefit is thus drawn from the redundancy between the C test biometric data in order to limit the power and the computing time.

The method may comprise the following features, taken alone or as a combination:

the set of indices is determined in a preliminary step by the second client unit by analyzing the invariant bits between the C test data.

the set of indices comprises a set number of indices, the indices being selected in any way, the second client unit applies a permutation to the invariant bits of each datum between the C test data so that said indices of said invariant bits match the indices of the set of indices, and the encoding keys are recovered for the permuted bits.

the set number of indices of the set of indices is determined beforehand by an database analysis, the set number of indices of the set of indices being selected so as to be less than the actual number of invariant bits between the C test data.

the steps for breaking down the function to be evaluated, for generating encoding keys and for sending garbled circuits to one of the client units are applied before acquiring the test data or the application of the permutation to said data.

both client units form a single client terminal, or alternatively the server and one of the two client units form a single entity, and wherein the other client unit receives the garbled circuits, the server also sends to the client unit an output matching table of each garbled circuit, so that the client unit which evaluates the function f may determine the value of the output keys of the evaluation.

alternatively, the method comprises a step during which the client unit having evaluated the function sends to the server the output keys for evaluation and the server infers therefrom, from the matching table of the outputs of each garbled circuit, the evaluations of function f.

the data are binary codes of irises, the function to be evaluated comprises the calculation of the normalized Hamming distance between the reference biometric datum and each of the C test biometric data and comprises the comparison of this distance with a threshold.

the invariant garbled circuit is evaluated only once for the C test data.

The invention also proposes a system for authentication of individuals, comprising:

a first client unit comprising a memory, a second client unit comprising means for acquiring at least one test datum, and a server, configured for generating garbled circuits for evaluating functions, each garbled circuit having as inputs a set of encryption keys for input data bits of the function to be evaluated and as an output the encryption keys corresponding to the bits of the result of the evaluated function, and wherein the steps for calculating the function are broken down into elementary logic operations, each garbled circuit further comprising a set of encoding keys of each of the possible inputs and outputs of each elementary logic operation, the system being characterized in that it is configured for applying the method as described earlier.

The invention also proposes a server, comprising a calculator adapted for generating garbled circuits for evaluating a function comprising the comparison of a reference datum with a plurality C test data, the server being characterized in that it is adapted for, from a set S comprising indices of test data, such that the value of the bit of each test datum associated with an index of the set S is invariant on whole of the C test data, breaking down the function to be evaluated into:

a sub-function $f_S$ which comprises all the logical operations for which the output exclusively depends on input bits for which the index belongs to said set S, and a sub-function $f_{\bar{S}}$ which comprises all the logical operations of the function f non-evaluated by the sub-function $f_S$, and for generating a single garbled circuit, named invariant garbled circuit, for the evaluation of the sub-function $f_S$, and for each of the C test data, a garbled circuit, named variant garbled circuit, for evaluation of the sub-function $f_{\bar{S}}$.

The invention also proposes a computer program product, comprising code instructions for applying a method comprising the generation of garbled circuits for evaluating a function comprising the comparison of a reference datum with a plurality of C test data, said generation comprising:

from a set S comprising indices of test data, such that the value of the bit of each test datum associated with an index of the set S is invariant on whole of the C test data, the breaking down of the function to be evaluated into:

a sub-function $f_S$ which comprises all the logical operations for which the output exclusively depends on input bits for which the index belongs to said set S, and a sub-function $f_{\bar{S}}$ which comprises all the logical operations of the function f non evaluated by the sub-function $f_S$, and the generation:

of a single garbled circuit, named invariant garbled circuit, for evaluating the sub-function $f_S$, and, for each of the C test data, of a garbled circuit, named variant garbled circuit, for evaluating the sub-function $f_{\bar{S}}$, when it is executed by a calculator.

PRESENTATION OF THE FIGURES

Other features, objects and advantages of the invention will become apparent from the following description, which is purely illustrative and nonlimiting, and which should be read with reference to the appended drawings, wherein.

Figure 3:
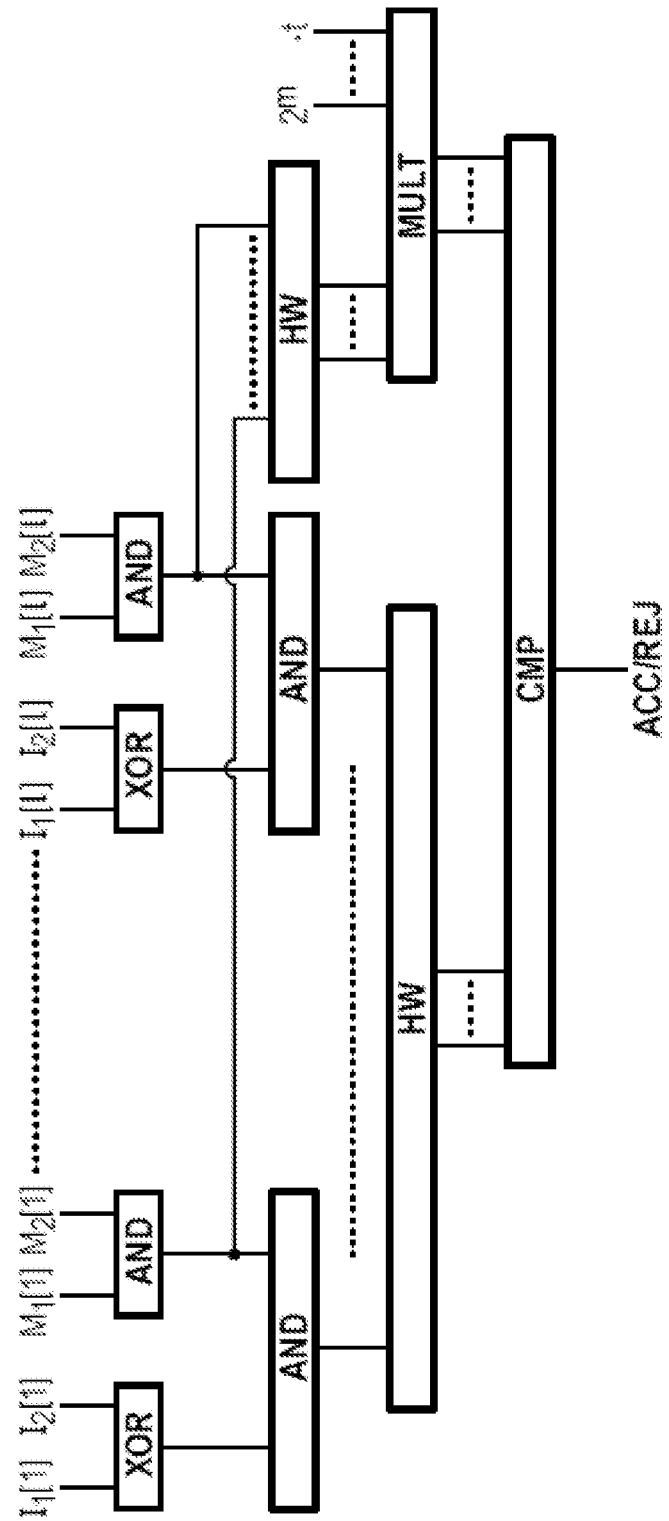
Figure 4:
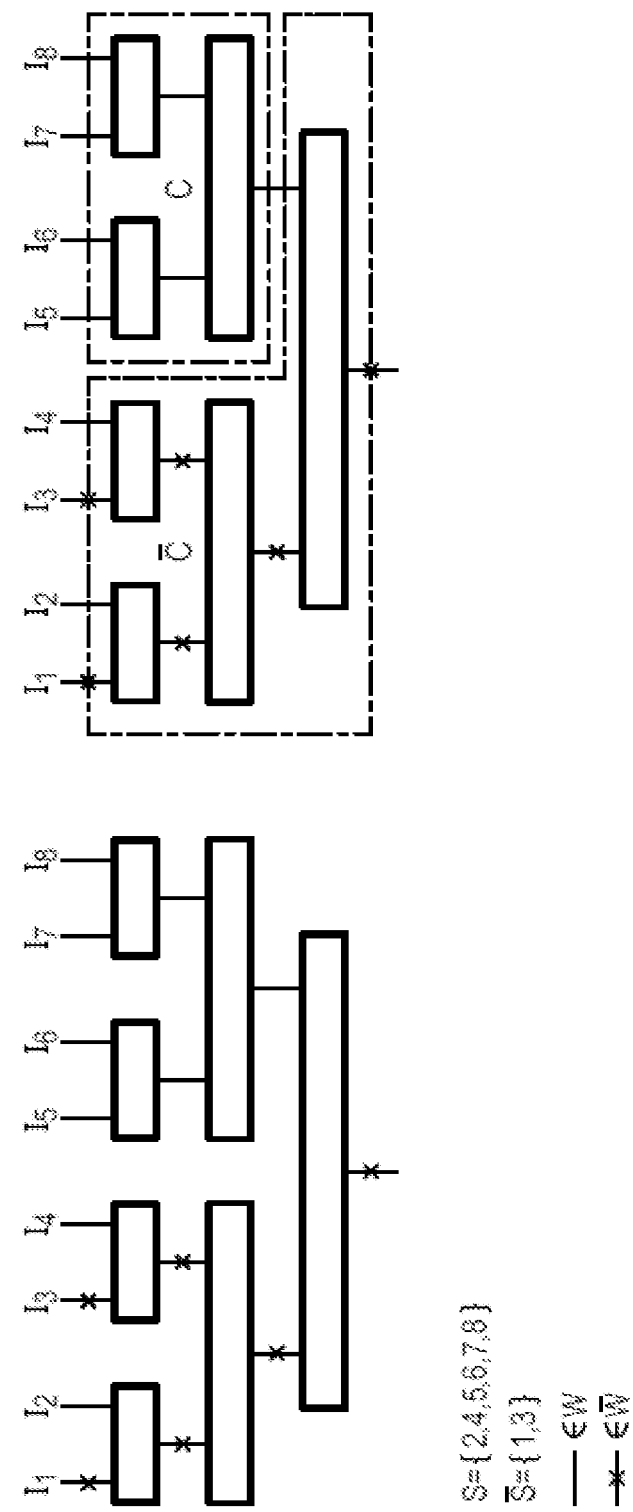
Figure 5:
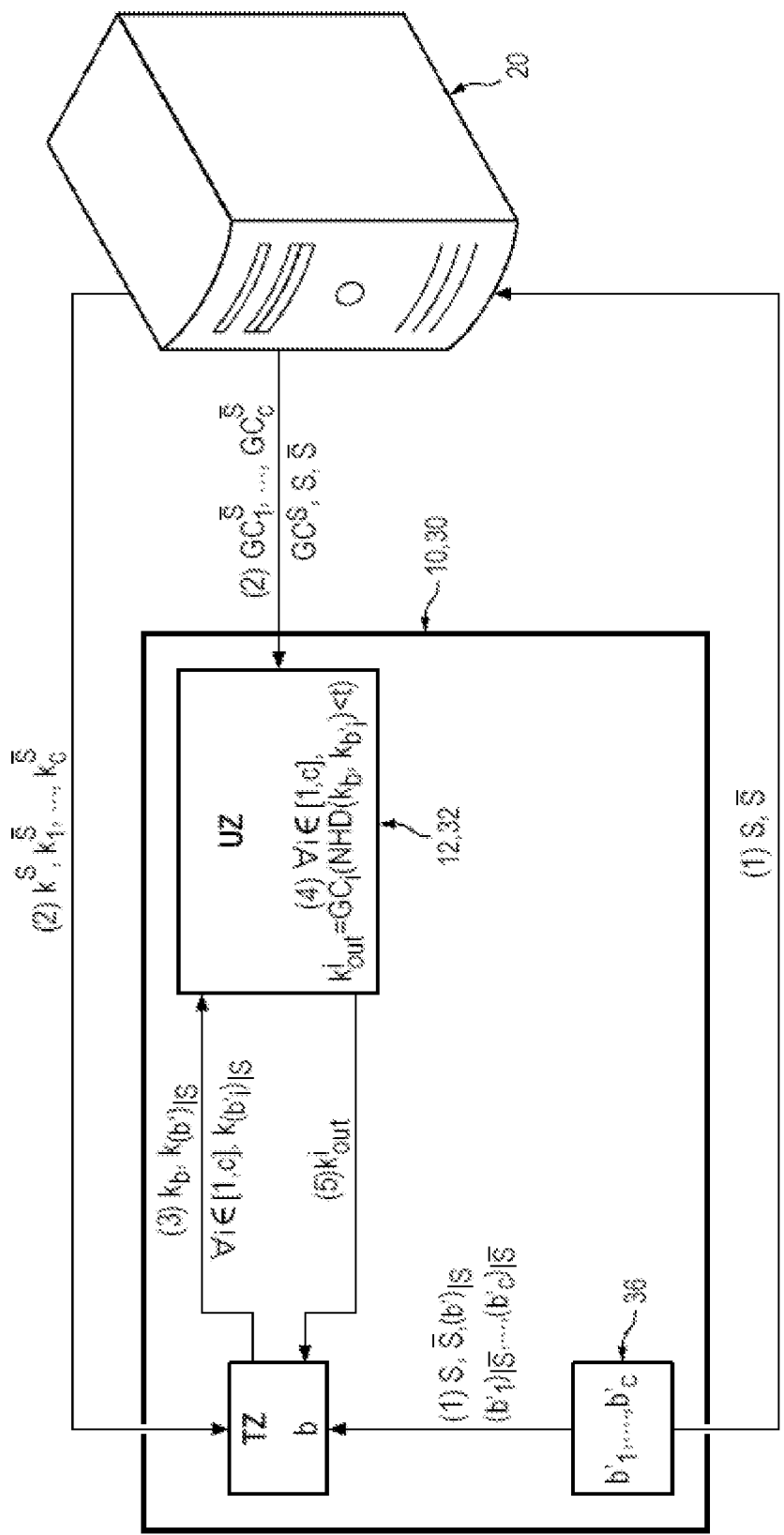
Figure 6:
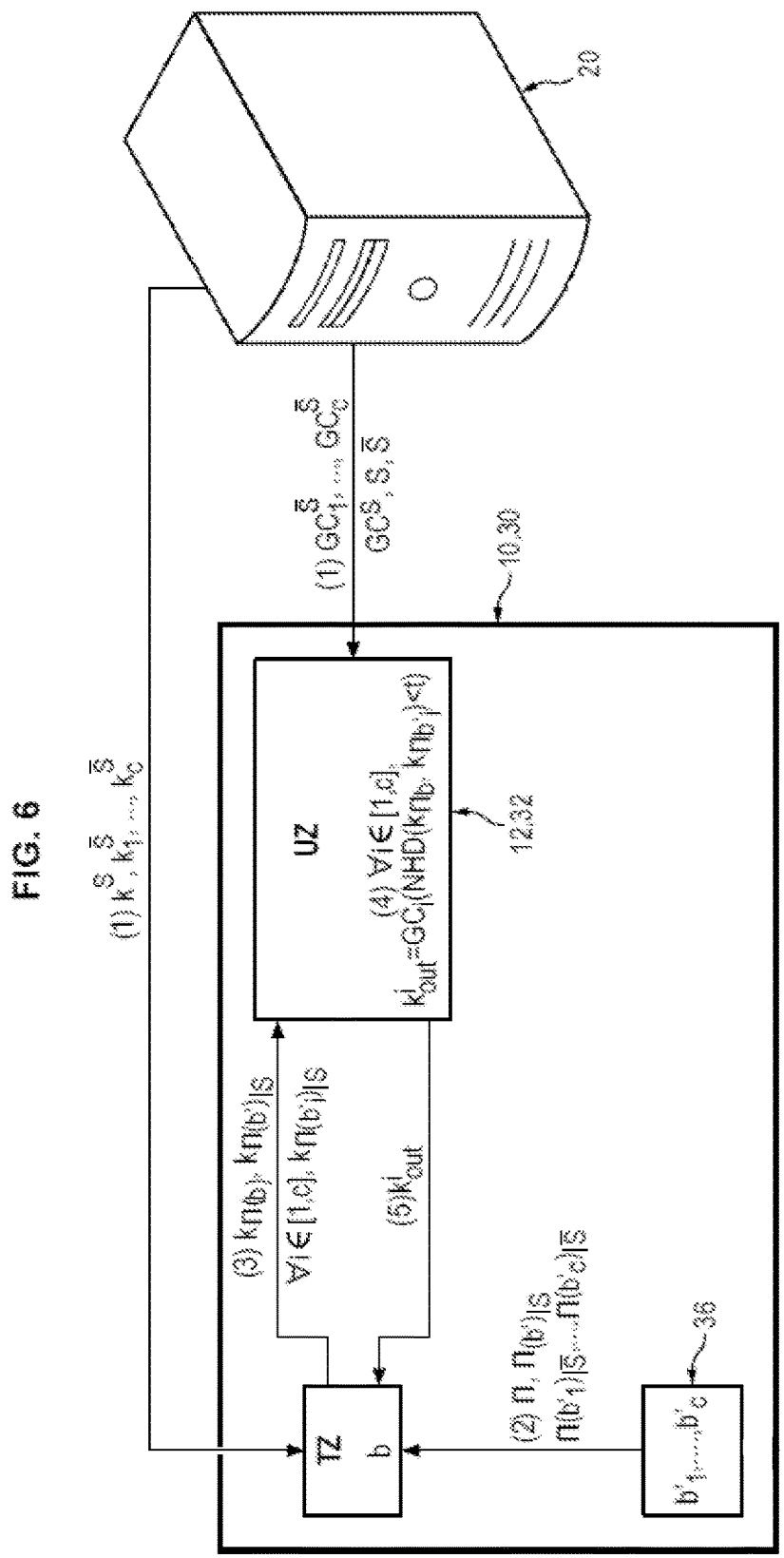

FIG. 3 illustrates a breaking down into elementary operations of a function to be evaluated, wherein the function is moreover a normalized Hamming distance followed by a comparison of the result of the Hamming distance with a threshold, FIG. 4 illustrates a simplified scheme of a breaking down of the function into two sub functions, each associated with a garbled circuit, FIGS. 5 and 6 detail two alternatives of a method according to the invention.

DETAILED DESCRIPTION

Figure 1:
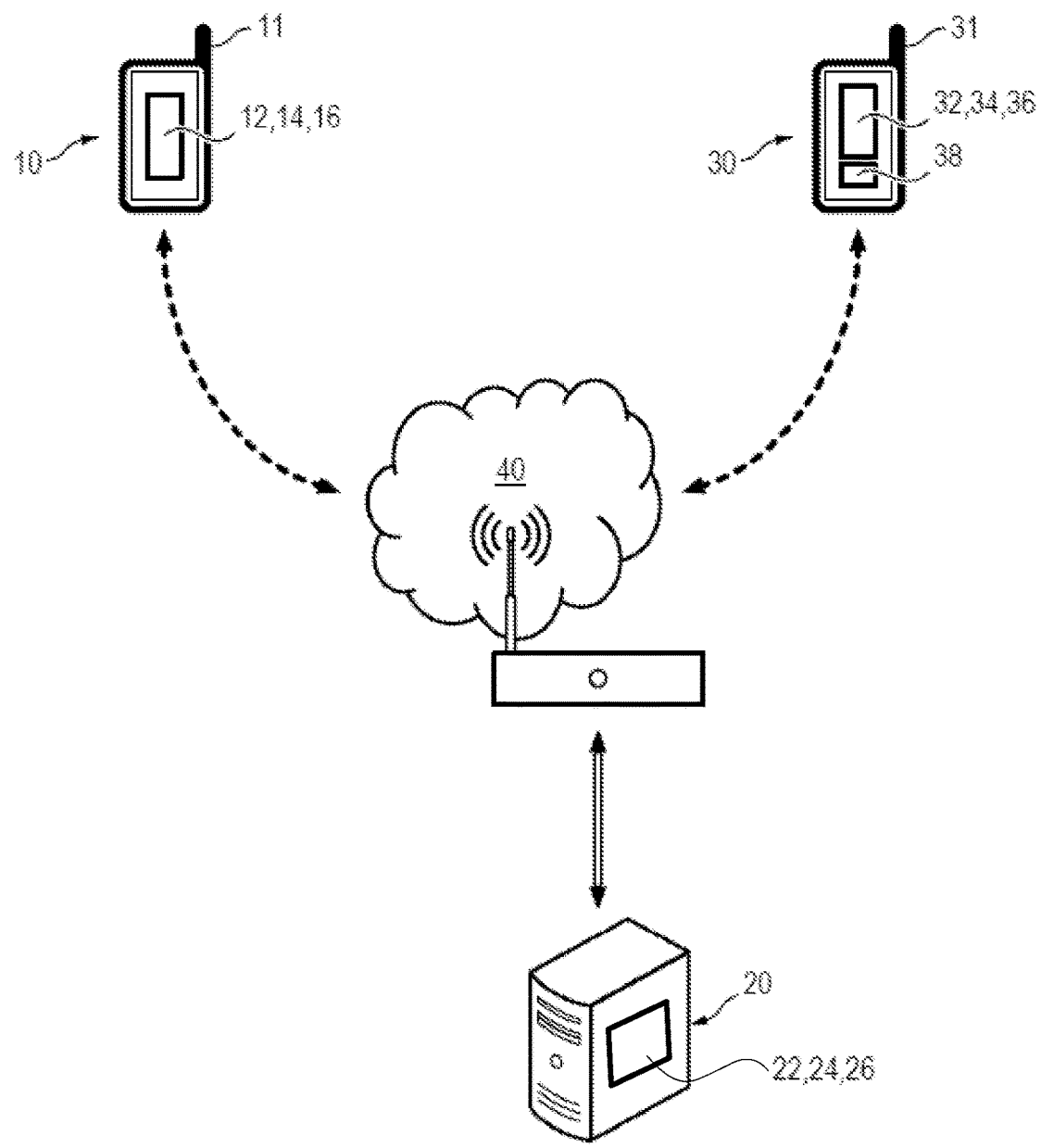
FIG. 1 illustrates a system for authentication of a user at a client unit.

With reference to FIG. 1, a system allowing authentication of a user is illustrated. The system comprises a first client unit 10, a server 20 and a second client unit 30.

The first client unit 10 and the second client unit 30 may be formed with a same terminal-client, such as a smart phone.

The client units 10, 30 and the server 20 may communicate with each other either directly, for example with a radiofrequency signal, or via a network 40.

The client units 10, 30 appear as a performing mobile telephone such as a smartphone, or else a digital tablet, or further a computer.

Each client unit 10, 30 comprises a computing unit 12, 32 notably provided with a memory 14, 34 and a calculator 16, 36.

Each client unit 10,30 may either be used by a legitimate user to which it belongs, i.e. a nonfraudulent user, or else by an illintentioned user, i.e. a fraudulent user. This fraudulent user may either be a person, or else a digital entity.

The memory 14, 34 may be in the form of a flash memory, or else a read only memory, of the ROM type, or else a random access memory RAM. The memory 14, 34 may also be in the form of an external storage, configured so as to be physically connected to the computing unit 12, 32, for example through a USB port.

The calculator 16, 36 is a microprocessor, a processor, or a microcontroller able to carry out calculations and in particular to apply cryptographic calculations. The calculator 16, 36 is notably configured for executing code lines stemming from a computer program.

The first client unit 10 comprises in its memory at least one biometric datum b relative to the user which may be legitimately authenticated.

Advantageously, the second client unit 30 comprises means for acquiring data, named "test" biometric data 38. These means 38 give the possibility of acquiring a biometric datum from an iris or a face for example. Mention may for example be made of an image sensor coupled with a software module for extracting a biometric datum.

The means for acquiring biometric data 38 may be integrated to a client unit 30 or external data, but connectable to the latter. For this acquisition devices are known connected by wire to a computer.

The acquisition means 38 are adapted for acquiring a raw image of a biometric feature which is then processed in order to obtain a biometric datum which may be utilized for applying an authentication. By biometric datum, is therefore meant a datum which may be directly utilized in an authentication process. The processes for treating the raw image are known and will not be detailed here.

The server 20 also itself comprises a computing unit 22 notably provided with a memory 24 and a calculator 26. The server 20 is typically a cloud server, i.e. a delocalized server.

The memory 24 may be in the form of a flash memory, or else of a read only memory, of the ROM type, or further a random access memory RAM. The memory 14 may also be in the form of an external storage, configured so as to be physically connected to the computing unit 22, for example through a USB port.

The calculator 26 is a microprocessor, a processor, or a microcontroller able to carry out calculations and in particular to generate garbled circuits and to generate random keys for each bit value. The calculator 26 is notably configured for executing code lines stemming from a computer program.

The three processing units 12, 22, 32 advantageously comprise remote communication interfaces 11, 21, 31 for sending and receiving data, notably via the network 40.

The network 40 is either an internet network, a wired network (Ethernet) or a wireless network (Wi-Fi), or a telephone network GPRS, EDGE, 3G or 4G or other network, or a local network, or a network via radiofrequency signals. The communication interfaces 11, 21, 31 are adapted for allowing communication according to the relevant network 40.

The two client units 10, 30 may be part of the same entity.

The server 20 may be the same entity as one of the two clients 10 or 30.

Two alternatives E, F of an authentication process will be described. This process uses similarities between several images stemming from a video for avoiding calculations on redundant data.

Within the scope of the present invention, the first client unit 10 has a biometric basic datum b in memory. For the continuation of the description, the example of an iris reference datum will be taken, obtained from an iris image (the biometric feature). The second client unit 30 as for it has the possibility of acquiring a video of the biometric feature for example the iris of a user who wishes to be authenticated. By video, is meant a succession of images captured at least ten hundredths of a second from each other. From this video, a set of C images or more generally C biometric data, named test data, is selected and extracted. These data all belong to the same user, they comprise similarities and notably a set of common bits.

The Garbled Circuits of the Yao Protocol

Oblivious Transfers

The Yao protocol applies oblivious transfers which are calculation operations between two units P1 and P2.

In this type of operation, P1 has a list of N indexed elements $X_i$, and P2 knows the number N of the elements of the list and selects an index i between 1 and N. By oblivious transfer, P2 recovers the $i^{th}$ element of P1, i.e. the P1 element indexed by i.

P1 does not learn any information on the index of the element recovered by P2.

P2 as for it does not recover any information on the other elements of the list held by P1.

The reference [Ra] shows the principle of the oblivious transfers.

Garbled Circuits

The Yao protocol also applies garbled circuits. The FIGS. 2a to 2e illustrate an exemplary embodiment of such a garbled circuit.

Figure 2:
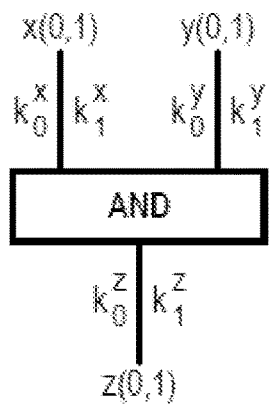
FIGS. 2a to 2e illustrate an exemplary embodiment of a garbled circuit.

A garbled circuit, for which a diagram is illustrated as an example in FIG. 2a, is an encrypted binary circuit obtained from a Boolean circuit representing a function f to be evaluated, this circuit being broken down into a succession of elementary logic gates (AND or XOR for example). The diagram of the Boolean circuit illustrated in FIG. 2a only comprises the elementary function "AND", which includes two inputs x and y, each being able to assume the binary value 0 or 1, and an output z, which may also assume the binary value 0 or 1.

Traditionally, with each logical gate is assigned a truth table or matching table, establishing the logical link between the outputs and the inputs. As an example in FIG. 2b, the truth table is illustrated of the logic function "AND".

In order to ensure securization of the evaluation of the function f, each possible input and each possible output from each elementary logic gate are encrypted by the creator of the garbled circuit (here the server 20), by means of random encryption key pairs, corresponding to the two possible Boolean values, specific to each input or output. For example in FIG. 2c the binary values 0 and 1 which x may assume have been for example replaced with corresponding keys $k_0^x$ and $k_1^x$, and the same for the values assumed by y and z.

This gives the possibility of obtaining a matching table wherein the binary values of inputs and of outputs are replaced with encryption keys.

The outputs of each logic gate are then encrypted by the encryption keys of the values of the corresponding inputs, in order to obtain an encrypted or garbled truth table in FIG. 2d.

Thus for example, in the case of the AND function, the encryption key $k_0^z$ corresponding to the value 0 of z appears in all the cases when x and y are not equal to 1. On the other hand, this key $k_0^z$ is not encrypted in the same way according to the values assumed by x and y: indeed, if x and y both have the value 0, the key $k_0^z$ is encrypted by means of the keys $k_0^x$ and $k_0^y$: this encrypted key is noted as $$Enc_{k_0^x, k_0^y}(k_0^z).$$

Finally, the input keys of the table are removed, and the keys obtained for each output are reordered randomly like in FIG. 2e, the encrypted and garbled truth table thereby obtained is what is really called the garbled circuit.

In order to be able to evaluate the function f of the circuit from the encryption keys, a matching table T between the encryption keys of the result of the function which is evaluated and the corresponding values of the bits is generated by the creator of the circuit.

Yao Protocol

Finally, the Yao protocol is a secured computing method in which several portions wish to carry out a calculation from data which are available to them, without communicating between them the content of these data.

To do this, one of the portions (here the server 20) generates a garbled circuit for evaluation of a function f, as described above, as well as pairs of encryption keys (one for the binary value 0 and one for the binary value 1) for each of the input and output bits of the logical gates of the circuit. The generator of the garbled circuit also generates a matching table T between the encryption keys for the result of the function and the result itself.

The generator of the garbled circuit then sends to the other portion the garbled circuit, and the keys for encrypting the input data bits belonging to the generator. In other words, the server 20 sends the garbled circuit only to one from among both client units. If the server 20 and the client unit 10 (or respectively 30) are a same entity, the garbled circuit is sent to the client unit 30 (or respectively 10).

Thus, for each input bit x of the generator of the circuit equal to 0 (respectively 1), the generator only sends the encryption key $k_0^x$ (respectively $k_1^x$). As these keys are random, the user of the garbled circuit cannot obtain any information on the bits corresponding to the data held by the generator.

Further, the user of the garbled circuit recovers from the generator, by oblivious transfer, the keys corresponding to the input data bits of the function which they have.

Thus, for each input bit y of the user, the generator prepares a list with two elements consisting of $k_0^y$ and $k_1^y$ and the index selected by the user for the oblivious transfer is the value of the bit y.

Resorting to the oblivious transfer method allows that the generator does not obtain any information on the values of the bits of the data of the user of the circuit.

Finally, the user of the garbled circuit may evaluate the function by means of keys which it has received in order to obtain the output keys corresponding to the result of the evaluation of the function f. Either the generator of the garbled circuit sends the matching table T to the user who infers therefrom the result of the function. Or the user sends to the generator of the garbled circuit the output key(s) and the generator of the garbled circuit infers therefrom the result of the function by means of the matching table.

Identification by Binary Codes of Irises

The iris biometric datum comprises two vectors IC=(I, M) of bits of length L, wherein L generally has the value 2048. Thus these are referred to as iris binary codes (called IrisCode, see reference [IRIS]). The vector I corresponds to the acquired image (for example by the acquisition means 38) and the vector M is a mask which corresponds to the reliable bits of the first vector I. Moreover, a bit of the vector M which has the value 0 represents a deletion (eyelid, blurred area, area hidden by the eyelid, etc.). If a bit of the mask M has the value 0, by convention, the bit associated with the image is also set to 0.

In order to compare two iris binary codes $(I_1, M_1)$ and $(I_2, M_2)$, a standardized Hamming distance NHD is commonly used:

$$NHD((I_1, M_1), (I_2, M_2)) = \frac{HW((I_1 \text{ xor} I_2) \text{ and } (M_1 \text{ and } M_2))}{HW(M_1 \text{ and } M_2)}$$

Wherein for any vector a, HW(a) represents the Hamming weight of a.

This normalized Hamming distance NHD is then compared with a threshold t. If the normalized distance NHD is less than the threshold t, this is an authentication; otherwise this is a rejection.

The function consisting of calculating this Hamming distance is called f and it is compared with the threshold t. The function f is broken down into a series of elementary Boolean operations and may therefore be used within the scope of a garbled circuit as described earlier.

For practical reasons of a floating comma, the comparison NHD<t is carried out with the following inequality:

$$2^m \cdot HW((I_1 \text{xor} I_2) \text{and} (M_1 \text{and} M_2)) < 2^m \cdot t \cdot HW(M_1 \text{and} M_2)$$

With $2^m$ which is selected for ensuring that $2^m t$ is an integer.

FIG. 3 illustrates a global diagram for two iris binary codes 1 and 2 wherein the $i^{th}$ coordinated bit of the vectors is illustrated between square brackets. The circuit is broken down into sub-boxes designated: AND for the Boolean operation "and", XOR for the Boolean operation of "exclusive or", HW for calculating the Hamming weight, CMP for the comparison and MULT for the multiplication. In the present case, as $2^m t$ is known, the multiplication may further be replaced with additions. Such circuits (MULT, HW, CMP, etc.) are known and are shown in reference [KSS].

Thus, the function f comprises a succession of and XOR gates. In order to calculate f it is sufficient to enter the values {0; 1} of the bits of the coordinates of the input vectors I and M.

The output given by the function f may correspond to 1 if the inequality is verified, in which case the match is verified and the authentication is validated; the output may otherwise correspond to 0.

Authentication by the Face

In the case of a biometric datum obtained from a face image, each face image is treated in order to obtain a utilizable biometric datum (for example by identification of positions of the characteristic points of the face), and the function f to be evaluated with garbled circuits GC is the Euclidean distance calculated between the biometric datum obtained from the recruitment image and each obtained biometric datum from each test image, followed by a comparison with a threshold.

Similarities Between the Images of the Video

In order to simplify the explanation of the methods, the following notations are introduced: it is desired to evaluate the function f between a reference biometric datum b stored in the first client unit 10, and C test biometric data $b'_1 \ldots b'_C$, wherein C is a positive integer strictly greater than 1.

The function f is therefore evaluated with the inputs $(b'_1, \ldots, b'_C)$ and b for obtaining $f(b, b'_1) \ldots, f(b, b'_C)$. Each input biometric datum b, $b'_i$ is a vector of L bits $b'_i = (b'_i[1], \ldots, b'_i[L])$ with i ranging from 1 to C.

In the case of an iris binary code with image and mask, one has $b'_i = (I_i, M_i)$, wherein $I_i$ and $M_i$ are vectors of L bits.

As the C data $b'_i$ stem from a same video, they have similarities, i.e. there exists a certain number of bits which have the same value on the C data $b'_i$.

Thus the set S of invariant indices is thereby defined, defined by:

$$S = \{i \in [1 \ldots L] | \forall j_1, j_2 \in [1 \ldots C]^2, b'_{j_1}[i] = b'_{j_2}[i]\}$$

Complementarily the set $\overline{S}$ of the alternative indices is defined, defined by $$\overline{S} = [1 \ldots L] \setminus S$$

For the binary iris codes, one therefore has:

$$S = \{i \in [1 \ldots L] | \forall j_1, j_2 \in [1 \ldots C]^2, I_{j_1}[i] = I_{j_2}[i] \text{ and } M_{j_1}[i] = M_{j_2}[i]\}$$

As L=2048, one also has:

$$\overline{S} = [1 \ldots 2048] \setminus S$$

As both sets form a partition of the indices of the inputs (i.e. that $S \cup \overline{S} = [1 \ldots L]$ and $S \cap \overline{S} = \emptyset$), the normalized Hamming distance may be broken down into the following form, for two iris binary codes $(I_1, M_1), (I_2, M_2)$:

$$NHD((I_1, M_1), (I_2, M_2)) = \frac{NHD_{NUM}((I_1, M_1), (I_2, M_2))}{NHD_{DEN}(M_1, M_2)}$$

$$= \frac{NHD_{NUM}((I_1, M_1), (I_2, M_2))_S + NHD_{NUM}((I_1, M_1), (I_2, M_2))_{\overline{S}}}{NHD_{DEN}(M_1, M_2)_S + NHD_{DEN}(M_1, M_2)_{\overline{S}}}$$

With
$NHD_{NUM}((I_1, M_1), (I_2, M_2)) = HW((I_1 \text{xor} I_2) \text{and}(M_1 \text{ and } M_2))$,
$NHD_{DEN}(M_1, M_2) = HW(M_1 \text{and} M_2)$,
$NHD_{NUM}(\ldots)_S$, $NHD_{DEN}(\ldots)_S$ being the evaluation of $NHD_{NUM}(\ldots)$, $NHD_{DEN}(\ldots)$ for the indices of S, and
$NHD_{NUM}(\ldots)_{\overline{S}}$, $NHD_{DEN}(\ldots)_{\overline{S}}$ being the evaluation of $NHD_{NUM}(\ldots)$, $NHD_{DEN}(\ldots)$ for the indices of $\overline{S}$.

As for any index i of S, one has $\forall j_1, j_2 \in [1 \ldots C]^2$, $I_{j_1}[i] = I_{j_2}[i]$ et $M_{j_1}[i] = M_{j_2}[i]$, it is ensured that $NHD_{NUM}((I_{j_1}, M_{j_1}), (I_{j_2}, M_{j_2}))_S$ and $NHD_{DEN}(M_{j_1}, M_{j_2})_S$ are independent of $j_2$ and $j_1$. In practice, one of the two iris codes used in NHD is the enrolled iris code $(I_b, M_b)$, therefore it is ensured that for $\forall j \in [1 \ldots C]$, $NHD_{NUM}((I_b, M_b), (I_j, M_j))_S$ and $NHD_{DEN}(M_b, M_j)_S$ are independent of j.

It is therefore possible to break down the function f (which is here function of NHD and of t) to be evaluated into two sub-function $f_S$ and $f_{\overline{S}}$, one relating to the inputs and the outputs which are unchanged on the C biometric data and the other relating to the inputs and the outputs for which the value is not identical for all the C data. The bits of b as for them are inputs distributed on both sub-functions $f_S$ and $f_{\overline{S}}$, according to the belonging of S or not to the bit of $b'_i$ used in the elementary calculation with the b associated bit.

With these two sub-functions are respectively associated: a garbled circuit $GC^S$, named "invariant" garbled circuit, associated with the function $f_S$, which is identical for the C data $b'_1, \ldots, b'_C$ (the evaluation of the denominator and of the numerator of NHD for the inputs belonging to S) and C garbled circuits $GC_1^{\overline{S}}, \ldots, GC_C^{\overline{S}}$, named "variant" garbled circuits, associated with C functions $f_{\overline{S}}$, each of which is specific to one of the C data $b'_1, \ldots, b'_C$ (the evaluation of the denominator and of the numerator of NHD for the other inputs), followed by grouping of the results and the comparison with a threshold. Thus there are C+1 garbled circuits to be generated, but the C garbled circuits $GC_1^{\overline{S}}, \ldots, GC_C^{\overline{S}}$ to be evaluated for each datum has less complexity.

By minimizing the number of logic gates and by minimizing the number of wires for which the value depends on at least one input for which the index belongs to $\overline{S}$, the evaluation of the garbled circuits will be improved.

FIG. 4 illustrates a simplified diagram of what was explained earlier. The term of wire designates the inputs and the outputs between the elementary logic operations. The set of invariant wires is noted as W, and its complementary $\overline{W}$. The notations are specific to this figure. Here S=(2, 4, 5, 6, 7, 8).

Now, two alternatives of the authentication method will be described. Both of these alternatives each use the fact that a portion of the breaking down of f into elementary functions may remain invariant because of the similarities which may exist between the C data.

The first alternative, illustrated in FIG. 5, gives the possibility of minimizing the number of garbled circuits to be generated and therefore to be evaluated. But it is not possible to generate garbled circuits during a precalculation phase since they depend on the set S which itself depends on the test biometric data $b'_1, \ldots, b'_C$ of the client unit 30.

The second alternative, illustrated in FIG. 6, gives the possibility of limiting the number of garbled circuits to be generated (without necessarily minimizing it). But as compared with the first alternative, the garbled circuits may be precalculated before acquiring test biometric data $b'_1, \ldots, b'_C$ by the client unit 30 since the garbled circuits are independent of the test biometric data $b'_1, \ldots, b'_C$ of the client unit 30.

First Alternative

In a first step, E1, the second client unit 30, from the test biometric data $b'_1, \ldots, b'_C$ determines the set S, by identifying the invariant bits between all the images. This step E1 may be preceded with a step E0 for acquiring said data with the acquisition means 38.

In a second step E2, the second client unit 30 sends the set S relating to the invariant indices to the server 20 so that the latter may generate garbled circuits as shown earlier.

In a third step E3, the server breaks down the function f into two sub-functions $f_S$ and $f_{\overline{S}}$ for generating an invariant garbled circuit $GC^S$ and for generating C alternative garbled circuits $GC_1^{\overline{S}}, \ldots, GC_C^{\overline{S}}$. In order to evaluate the function f for a biometric datum $b'_i$, $GC^S$ and $GC_i^{\overline{S}}$ has thereby to be evaluated. The garbled circuit consisting of $GC^S$ and $GC_i^{\overline{S}}$ is noted as $GC_i$, with i ranging from 1 to C.

In a fourth step E4, concomitantly with step E3, the server 20 randomly generates the encryption keys $k^S, k_1^{\overline{S}}, \ldots, k_C^{\overline{S}}$ for the C+1 garbled circuits.

In a fifth step E5, the server 20 sends the garbled circuits to one from among the two client units 10, 30. For the sake of clarity, it will be assumed that the server 20 sends them to the first client unit 10, but it may also alternatively send them to the second client unit 30.

Subsequently, in a sixth step E6, both client units 10, 30 recover from the server 20 by oblivious transfer of the encoding keys $k_b$, $k_{b'}$ corresponding to the values of the bits of the inputs of the function f to be evaluated for each garbled circuit.

Each client unit recovers the keys which relate to the biometric datum which it has: the first client unit 10 recovers a set of keys $k_b$ comprising a key associated with each bit of the datum b; the second client unit 30 recovers a set of keys $k_{b'}$ comprising a key for each bit associated with an index belonging to S and C keys for each bit associated with an index belonging to $\overline{S}$.

According to the example given above wherein the datum b comprises 2,048 bits, the set of keys $k_b$ comprises 2,048 keys and the set of keys $k_{b'}$ comprises $1 \times |S| + C \times |\overline{S}|$ keys, wherein |S| designates the number of indices in the set S and $|\overline{S}|$ designates the number of indices in the set $\overline{S}$. The set of keys $k_{b'}$ therefore comprises a number of keys of less than C×2,048 keys.

In a seventh step E7, the second client unit 30 sends its encoding keys to the first client unit 10. As these are encoded keys, the first client unit 10 ignores the masked value of the bit.

In a step E8, with all the keys, the first client unit 10 may evaluate by means of its calculation unit 12 the function f for each of the C data $b'_1, \ldots, b'_C$ and the datum b.

For the C images, the invariant garbled circuit $GC^S$ has only to be evaluated once and may be used for the C evaluations of the function f, whence a gain in time and in resources. The variant garbled circuits $GC_1^{\overline{S}}, \ldots, GC_C^{\overline{S}}$ are themselves also executed.

At the output C encoding keys are obtained $k_{out}^i = GC_i(NHD(k_b, k_{b'})) < t)$.

Finally, in a step E9, it is sufficient to determine to which value the output keys $k_{out}^i$ correspond: for example 1 for stating that the inequality is verified (validated authentication) and 0 for stating that it is not verified (rejection). As explained earlier, the step E9 comprises either the sending by the server of the matching table to the client unit 10 in order to carry out the conversion of the output keys, or the sending by the client unit 10 to the server so that the latter carries out the conversion and obtains the result.

This embodiment of the method nevertheless requires an exchange between the client units 10, 30 and the server 20 so as to be able to apply the authentication. Indeed, the server 20 needs to exactly determine S in order to build the garbled circuits. Therefore, the server 20 cannot generate garbled circuits during a phase named pre-calculation phase.

Second Alternative of the Method

For this purpose, it is necessary to get rid of the variability of the set S as it was defined earlier and which depends on the acquired biometric data $b'_1, \ldots, b'_C$.

For this, in a preliminary step F1, carried out by means of a database of biometric data of the same nature as those which have to be used in the method, an upper image $|\overline{S}_{max}|$ margin of the number of indices which the set S contains is evaluated. This value $|\overline{S}_{max}|$ is stored in the memory 24 of the server 20 and will be used for the generation of the invariant garbled circuit $GC^S$ and of alternative garbled circuits $GC_1^{\overline{S}}, \ldots, GC_C^{\overline{S}}$. For the sake of simplifications, are thereby considered that $\forall i,j \in [|\overline{S}_{max}|+1 \ldots L]^2$, $\forall j_1, j_2 \in [1 \ldots C]^2$, $I_{j_1}[i] = I_{j_2}[i]$ and $M_{j_1}[i] = M_{j_2}[i]$.

Alternatively, it is possible to evaluate a lower margin $|S_{max}|$ of the number of indices contained by the set S. One therefore has $|S_{max}| = L - |\overline{S}_{max}|$.

The description will be made for $|\overline{S}_{max}|$.

As the generation of the garbled circuits is accomplished independently of the test biometric data $b'_i$, the ordering of the indices belonging to S (or $\overline{S}$) may be arbitrary. In this respect, the data $b'_i$ are permuted during a step F0 described hereafter for guaranteeing that the indices of the invariant bits are in S.

In a subsequent step F2, the upper margin $|\overline{S}_{max}|$ is stored in the memory 24 of the server 20.

The third step F3 is similar to step E3.

The fourth step F4 is similar to step E4.

The fifth step F5 is similar to step E5.

The sixth step F6 is similar to step E6, except that the encoding keys $k_b$, $k_{b'}$ correspond to the values of the permuted bits of the inputs of the function f to be evaluated, noted as $k_{\Pi(b)}$, $k_{\Pi(b')}$. In particular, the step for applying the permutation on the bits of the data $(b'_1, \ldots, b'_C)$ allows the second client unit to recover the keys corresponding to the right sets S and $\overline{S}$. The first client unit 10 recovers a set of keys $k_{\Pi(b)}$ relatively to the permuted bits of the reference biometric datum b and the second client unit 30 recovers a set of keys $k_{\Pi(b')}$ relatively to the permuted bits of the test biometric data $(b'_1, \ldots, b'_C)$, the set comprising a key for each of the indices of bits belonging to S and C keys for each of the indices belonging to $\overline{S}$.

The seventh step F7 is similar to step E7.

The eighth step F8 is similar to step E8.

The ninth step F9 is similar to step E9. Preferably, the matching table T is sent with the garbled circuits, after the authentication may be accomplished without exchange with the server 20 after acquiring the test data.

Similarly to E0, this alternative comprises a step F0 which may comprise an acquisition of the test biometric data $b'_1$ to $b'_C$ by the client unit 30.

The step F0 also comprises the application, by the second client unit 30, of a permutation on the bits of these test biometric data $(b'_1, \ldots, b'_C)$, depending on the value of $|\overline{S}_{max}|$ calculated in step F1, so that the bits of the test biometric data are identical on the indices $[|\overline{S}_{max}|+1 \ldots L]$.

This gives the possibility of guaranteeing that the invariant bits between the data $b'_1$ to $b'_C$ are actually in the set S and that the other bits are in the set $\overline{S}$.

In this alternative, the step F0 for acquiring data is therefore carried out after step F1. It may be advantageously carried out after any of the steps F1 to F5, which are carried out in a phase named pre-calculation phase.

This second alternative of the method is less efficient than the first in terms of computing time since the value $|\overline{S}_{max}|$, respectively $|S_{max}|$, is selected so as to be greater, respectively lower, than the actual number of variant, respectively invariant bits. Nevertheless, it allows an upstream generation of the garbled circuits, independently of the biometric data $b'_1, \ldots, b'_C$, which allows acceleration of the authentication phase (if the pre-calculations are not taken into account).

Case when Both Client Units have a Same Client Terminal

This case is illustrated in FIGS. 5 and 6.

The terminal generally comprises a confidence area TZ and a non-confidence area UZ. The confidence area comprises not very many calculation means and not much memory, unlike the non-confidence area.

The confidence area stores the reference biometric datum b and the non-confidence area will evaluate the function f by executing the garbled circuits.

This is the confidence area which receives the encoding keys. Therefore, there is then a transfer between the acquisition means 38 towards the confidence area of the data $b'_1, \ldots, b'_C$.

For the first alternative of the method, there is a transfer of data bits belonging to S and a transfer of data bits belonging to $\overline{S}$, so that the confidence area recovers the adequate keys.

For the second alternative of the method, there is a transfer of permuted data bits which belong to S and a transfer of permuted data bits belonging to $\overline{S}$, Case when the Server and One of the Two Client Units have a Same Entity To simplify, the group of the server 20 and one of the two client units 10 will be called a "server" and the other client unit 30 which is not included in the server will be called "client". The server generates the garbled circuits and the client evaluates the garbled circuits.

In order to obtain the set of keys of the input bits, the server sends the keys which correspond to its own inputs to the client. There is no need of oblivious transfers for these keys since the server has generated the garbled circuits. The client, as for it recovers the keys which correspond to its own inputs by means of oblivious transfers with the server, so that the latter cannot infer therefrom the inputs to the client.

The invention claimed is:

1. A method for authenticating a user comprising:
    a first client unit comprising a memory in which is stored a reference biometric datum (b),
    a second client unit acquiring at least one test biometric datum (b'), and
    a server, generating garbled circuits (GC) for evaluating functions, each garbled circuit (GC) having as inputs a set of encryption keys of input data bits of the function to be evaluated and as an output the encryption keys corresponding to the bits of the result of the evaluated function, and wherein the steps for calculating the function are broken down into the form of elementary logical operations, each garbled circuit further comprising a set of encoding keys of each of the possible inputs and outputs of each elementary logic operation,
    the method comprising the comparison of a number C of test data ($b'_1, \ldots, b'_C$) acquired on the user by the second client unit with the reference datum, said comparison comprising the calculation, by means of garbled circuits, of a distance between the reference datum (b) and each test datum ($b'_1, \ldots, b'_C$),
    wherein the comparison comprises the application of the following steps:
    (E3, F3) from a set S comprising indices of the test data ($b'_1, \ldots, b'_C$), such that the value of the bit of each test datum associated with an index of the set S is invariant on the whole of the C test data ($b'_1, \ldots, b'_C$), the server breaks down the function to be evaluated into:
        a sub-function $f_S$ which comprises all the logical operations for which the output exclusively depends on input bits for which the index belongs to said set S and generates for the evaluation of this sub-function $f_S$ a single garbled circuit ($GC^S$) a garbled circuit, named invariant garbled circuit,
        a sub-function $f_{\overline{S}}$ which comprises all the logical operations of the function f non-evaluated by the sub-function $f_S$ and generates, for each of the C test data ($b'_1, \ldots, b'_C$), a garbled circuit, named variant garble circuit ($GC_1^{\overline{S}}, \ldots, GC_C^{\overline{S}}$), for evaluation of the sub-function $f_{\overline{S}}$, (E4, F4) the server randomly generates encoding keys ($k^S, k_1^{\overline{S}}, \ldots, k_C^{\overline{S}}$) for the single invariant garbled circuit ($GC^S$) and for the C variant garbled circuits ($GC_1^{\overline{S}}, \ldots, GC_C^{\overline{S}}$),
    (E5, F5) the server sends the garbled circuits ($GC^S, GC_1^{\overline{S}}, \ldots, GC_C^{\overline{S}}$,) to one of the client units,
    (E6, F6) both client units recover from the server by oblivious transfer (OT):
    encoding keys ($k_b, k_{b'}$) corresponding to the values of the input bits of the function (f) to be evaluated depending on the reference data (b) and on the C test data (b') respectively at their disposal, the first client unit recovering a set of keys ($k_b$) relative to the reference biometric datum (b) and the second client unit recovering a set of keys ($k_{b'}$) comprising a key for each bit associated with an index belonging to the set S and C keys for each bit associated with an index not belonging to S, and
    (E7, F7) the client unit having received the garbled circuits recovers the encoding keys ($k_b, k_{b'}$) from the other client unit, and (E8, F8) evaluates the function (f) for each of the C test data, with as inputs the recovered keys, by executing the garbled circuits ($GC^S, GC_1^{\overline{S}}, \ldots, GC_C^{\overline{S}}$)
    (E9, F9) depending on said evaluations of f, either authentication or not of the user or of the object.

2. The method according to claim 1, wherein the set (S) of indices is determined in a preliminary step (E1) by the second client unit by analysis of the invariant bits between the C test data ($b'_1, \ldots, b'_C$).

3. The method according to claim 1, wherein
    the set (S) of indices comprises a set number of indices ($L-5|\overline{S}_{max}|$), the indices being selected in any way,
    the second client unit applies an permutation ($\pi$) to the invariant bits of each datum ($b'_i$) between the C test data so that said indices of said invariant bits match to the indices of the set of indices (S), and
    the encoding keys are recovered for the permuted bits.

4. The method according to claim 3, wherein the set number of indices of the set of indices (S) is determined beforehand by a database analysis, the set number of indices of the set of indices being selected so as to be less than the actual number of invariant bits between the C test data.

5. The method according to claim 3, wherein the steps for breaking down the function to be evaluated, for generating the encoding keys and for sending garbled circuits to one of the client units are applied before acquiring the test data or before applying the permutation to said data.

6. The method according to claim 1, wherein both client units form a single client terminal.

7. The method according to claim 1, wherein the server and one of the two client units form a single entity, and wherein the other client unit receives the garbled circuits.

8. The method according to claim 1, wherein the server also sends to the client unit a matching table (T) of the outputs of each garbled circuit (C), so that the client unit which evaluates the function f may determine the value of the output keys of the evaluation (kouti).

9. The method according to claim 1, further comprising a step during which the client unit having evaluated the function send to the server the output keys of the evaluation ($k_{out}^i$) and the server infers therefrom, from the matching table of the outputs of each garbled circuit, the evaluations of the function f.

10. The method according to claim 1, wherein the data (b, $b'_1, \ldots, b'_C$) are iris binary codes.

11. The method according to claim 1, wherein the function (f) to be evaluated comprises the calculation of the normalized Hamming distance between the reference biometric datum (b) and each of the C biometric test data (b'$_1$, ..., b'$_C$) and comprises the comparison of this distance with a threshold (t).

12. The method according to claim 1, wherein the invariant garbled circuit (GC$^S$) is evaluated only once for the C test data.

13. A system for authentication of individuals, comprising:
- a first client unit comprising a memory,
- a second client unit acquiring at least one test datum (b'$_1$, ..., b'$_C$), and
- a server, generating garbled circuits (GC) for evaluating functions (f), each garbled circuit (GC) having as inputs a set of encryption keys for input data bits of the function (f) to be evaluated and as output, the encryption keys corresponding to the bits of the result of the evaluated function (f), and wherein the steps for calculating the function (f) are broken down into the form of elementary logic operations, each garbled circuit further comprising a set of encoding keys (k) of each of the possible inputs and outputs of each elementary logical operation, wherein the system applies the method comprising the comparison of a number C of test data (b'$_1$, ..., b'$_C$) acquired on the user by the second client unit with the reference datum, said comparison comprising the calculation, by means of garbled circuits, of a distance between the reference datum (b) and each test datum (b$^1_1$ ... b'$_C$), wherein the comparison comprises the application of the following steps:

(E3, F3) from a set S comprising indices of the test data (b'$_1$, ..., b'$_C$), such that the value of the bit of each test datum associated with an index of the set S is invariant on the whole of the C test data (b'$_1$, ..., b'$_C$), the server breaks down the function to be evaluated into:

a sub-function $f_S$ which comprises all the logical operations for which the output exclusively depends on input bits for which the index belongs to said set S and generates for the evaluation of this sub-function $f_S$ a single garbled circuit (GC$^S$) a garbled circuit, named invariant garbled circuit, a sub-function $f_{\bar{S}}$ which comprises all the logical operations of the function f non-evaluated by the sub-function $f_S$ and generates, for each of the C test data (b'$_1$, ..., b'$_C$), a garbled circuit, named variant garble circuit (GC$_1^{\bar{S}}$, ..., GC$_C^{\bar{S}}$), for evaluation of the sub-function $f_{\bar{S}}$, (E4, F4) the server randomly generates encoding keys (k$^S$, K$_1^{\bar{S}}$, ..., k$_C^{\bar{S}}$) for the single invariant garbled circuit (GC$^S$) and for the C variant garbled circuits (GC$_1^{\bar{S}}$, ..., GC$_C^{\bar{S}}$), (E5, F5) the server sends the garbled circuits (GC$^S$, GC$_1^{\bar{S}}$, ..., GC$_C^{\bar{S}}$) to one of the client units, (E6, F6) both client units recover from the server by oblivious transfer (OT):

encoding keys (k$_b$, k$_{b'}$) corresponding to the values of the input bits of the function (f) to be evaluated depending on the reference data (b) and on the C test data (b') respectively at their disposal, the first client unit recovering a set of keys (k$_b$) relative to the reference biometric datum (b) and the second client unit recovering a set of keys (k$_{b'}$) comprising a key for each bit associated with an index belonging to the set S and C keys for each bit associated with an index not belonging to S, and (E7, F7) the client unit having received the garbled circuits recovers the encoding keys (k$_b$, k$_{b'}$) from the other client unit, and (E8, F8) evaluates the function (f) for each of the C test data, with as inputs the recovered keys, by executing the garbled circuits (GC$^S$, GC$_1^{\bar{S}}$, ..., GC$_C^{\bar{S}}$)

(E9, F9) depending on said evaluations of f, either authentication or not of the user or of the object.

* * * * *